Feb. 2, 1960   M. FAMELY   2,923,760
RETAINING CLAMPS
Filed Nov. 15, 1956
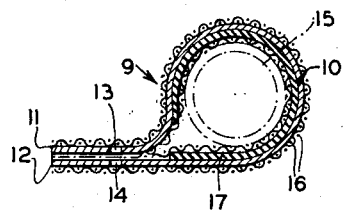
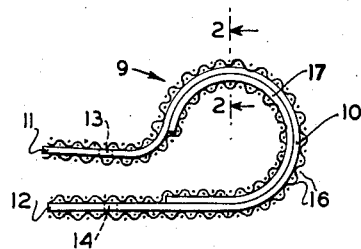
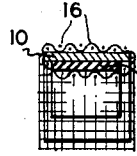
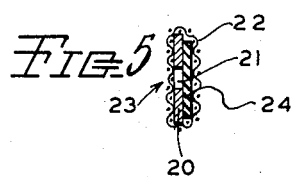
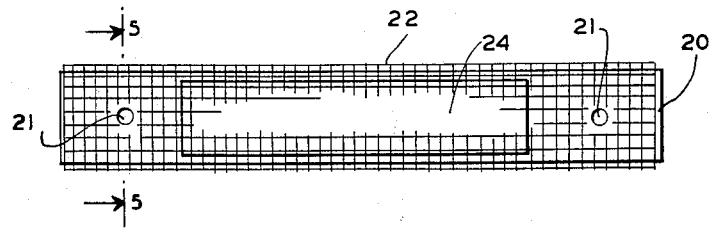
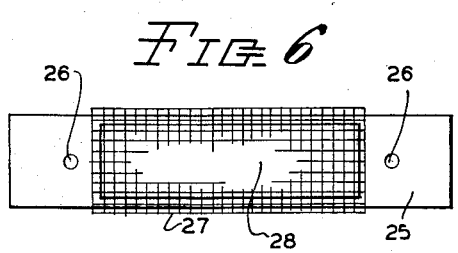
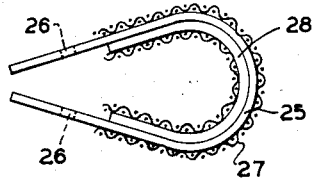
INVENTOR
MAX FAMELY

United States Patent Office 2,923,760
Patented Feb. 2, 1960

2,923,760
RETAINING CLAMPS

Max Famely, Linden, N.J.

Application November 15, 1956, Serial No. 622,390

3 Claims. (Cl. 174—40)

This invention relates to clamps as used for the aviation and allied industries for fastening a bundle of conductors, wires or a tubular object to a support.

The type of clamp with which the present invention is concerned is a generally C-shaped clamp with extending tabs for attachment to the support, made of a resilient material which will be unaffected by the extreme temperature variations encountered, will clamp the tubular object firmly without binding and in a manner to resist vibrationary forces, will be sufficiently resilient to open to embrace the tubular object and close thereabout, and will be easily assembled and installed in position.

Particularly but not exclusively in the aviation industry such clamps are used and problems arise because of slippage of the clamp on the tubular object, particularly when this is a group or bundle of electrical connecting wires or hydraulic lines, by virtue of the nature of the plastic or like material heretofore used. For example, a metal clamp has been proposed which is lined interiorly with a plastic or rubber cushion to prevent such slippage and to provide a gripping surface to resist the forces exerted on the clamp and tubular object when assembled, these forces being particularly present in an airplane in flight, for example.

It will be realized that the assembly of parts necessary to provide a metal clamp with a suitable liner for such desired gripping action is expensive and time consuming. It calls for the formation of the clamp first and the attachment of the liner thereafter. Also, there is a limitation at least in aircraft use of the type of liner which can be used. A strong, somewhat resilient material is required which will resist and be unaffected by extreme temperatures of heat and cold without damage or change. Nylon is specially suitable for such use and has been employed. However, nylon and equivalent plastic materials do tend to be non-binding when pressed into direct contact with a metal surface for example or with the braided metal casing of electrical conductors so that slippage may be encountered and also lack of a good grip when using these materials. This condition is aggravated when it is realized that assembly of the clamp on the tubular object in position in the aircraft is often done in confined quarters, so that accurate examination of the clamping action, grip or slippage is not always possible.

It is accordingly the object of the present invention to provide an improved novel clamp of this type having a conventional main body but suitably lined on its interior to provide a secure grip and no slippage, even under adverse conditions of assembly as in aircraft use.

It is a further object to provide such a non-slip, positive grip clamp which also can be readily assembled before or after formation of the body and can be economically manufactured.

It is another ancillary object of the invention to provide a ready means of grounding such a clamp and its attached tubular object, when this is desired, while still obtaining the secure, non-slip, gripping action necessary for aviation industry usage.

Generally, in practicing the present invention there is provided a clamp which has a metallic body, an inner lining of plastic in contact with the internal face thereof and a metallic sheath of wire mesh or a metallic stocking embracing the body and the lining to hold same in place. The sheath or sleeve of wire mesh may be co-extensive with the body of the clamp or may terminate short thereof. For example, when the clamp is formed as a conventional shaped C-clamp with extending tabs integrally formed with the open ends of the C-body, the sheath may terminate short of the tabs or may extend thereover. In like manner, the plastic liner may extend over the body and tabs but preferably will terminate short of the tabs when a C-clamp is used.

The metal of the clamp may be ductile or malleable enough to be formed into a clamp on site. Alternatively, the metal of the clamp may need to be machine shaped into the clamp formation.

In either case, the novel and improved clamp according to the invention may be formed with the shape of the clamp preformed or alternatively the formation of the clamp may be made after the improved unit has been assembled.

Thus, a conventional C-shaped clamp may have a sleeve or stocking or sheath of metallic mesh slipped over it, by using an oval of mesh slightly greater in the major diameter than the width of the C-clamp and the strip of plastic may be slipped between the inner face of the body of the clamp and part of the sheath and the unit crimped together.

Alternatively, and in a preferred form of economical construction, a flat thin metallic bar is used and a strip of plastic is laid thereover, the unit then being completed by slipping a sheath or stocking of metallic wire mesh over both. Thereafter, the unit is shaped into a clamp of desired contour.

The long bar of metal may be cut to size for a single clamp and the sheath or plastic strip or both may be shorter than the cut bar, so that the plastic strip or the sheath or both may terminate short of the ends of the finished clamp. For example, the tabs of a conventional C-clamp may be free of the plastic strip or of the metallic sheath or of both.

If desired, however, a long length of metallic bar may be formed as described with the plastic strip and embracing metallic wire sheath and this can then be cut to desired lengths to form clamps.

In this latter modification, if the metal is soft enough, the unit formed of bar, sleeve and plastic liner can be cut to length on location or at site, formed conventionally into a clamp, the bores in the tabs punched and the clamp is ready for use.

Any suitable plastic can be used for the liner but nylon is preferred. Also the metallic mesh can be close mesh stocking or open mesh netting and of any desired metal.

The clamp of the present invention has advantages in use including establishing of a good ground connection, direct and positive gripping and non-slip contact with the object embraced by the clamp.

Reference will now be made to the accompanying drawings, forming part of this description, and illustrating certain forms of the present invention, with a view to further understanding thereof.

Of the drawings:

Figure 1 is a side elevation of one form of novel clamp plus liner in open position according to the invention;

Figure 2 is a cross-section of the clamp of Fig. 1 taken on the line 2—2 of Fig. 1;

Figure 3 is a cross-section longitudinally of the clamp of Fig. 1, but modified to show the clamp in closed position around a tubular object;

Figure 4 is a view, in plan, of the assembly of parts used for making up a clamp according to the present invention, the parts being in position for formation of the clamp of Fig. 1, in accordance with one modification herein disclosed;

Figure 5 is a cross-section of the assembly of Fig. 4, taken on the line 5—5 of Fig. 4;

Figure 6 is a plan view of a modified assembly of parts used for making a modified form of clamp according to the present invention; and Figure 7 is a side elevation of a clamp when formed from the assembly of Fig. 6.

Referring now specifically to Figs. 1, 2 and 3, the clamp generally indicated at 9 is shown open in Fig. 1 and basically comprises a C-shaped body member with projecting tabs.

Specifically, clamp 9 comprises a generally circular open ended body section 10, in the form of a C, made of metal, to the open ends of which are tabs 11 and 12, projecting outwardly beyond the body and formed integrally therewith.

The shape comprising body 10 and tabs 11 and 12 can be formed by stamping when metal is used and forms a conventional metal C-clamp. In the form shown in Figs. 1, 2 and 3 the clamp comprising body 10 and tabs 11 and 12 is preformed to the shape shown, the metal being of a wide, thin, rectangular contour. The tabs 11 and 12 are conventionally bored as at 13 and 14 to permit attachment of the clamp when in closed position (Fig. 3) by passing a screw or bolt (not shown) through bores 13 and 14 which will be in register in closed position.

In accordance with the present invention means are provided to cushion and line the clamp for the purposes hereinbefore described. To this end, there is placed over the C-shaped body 10 and tabs 11 and 12 a tubular metallic wire mesh sheath 16 which is flattened to oval contour to make it possible to slip same over the metal of the body and tabs, the larger diameter of the oval being slightly greater than the width of the metal of the body 10 and tabs 11 and 12. On the interior face of the body 10 only there is then slipped beneath the sheath 16 and between the sheath 16 and the inner metallic face of body 10 a rectangular thin, flat plate or strip of plastic 17 which may be nylon or like plastic, the width of the strip 17 being substantially that of the body 10. The strip 17 is anchored into place by crimping the sheath 16 thereon in a conventional manner.

Strip 17 will be of such length as to terminate at or before the ends of the C-shaped body 10 and will not extend to and over the tabs 11 and 12, whereas in the form shown in Figs. 1 to 3 the metallic mesh sheath 16 will extend over both the tabs 11 and 12 and body 10, as shown. The substance of the sheath 16 will be readily pushed aside at the parts over the bores 13 and 14 to allow passageway of a screw or like anchoring member through the bores when they are in register (Fig. 3). Alternatively, the mesh sheath 17 may be punched out over the bores 13 and 14 with a conventional tool.

It will be readily seen by examining Figs. 1 and 3 that the opened clamp 9 may be slipped over any tubular member to be supported and the clamp then closed (Fig. 3) and in Fig. 3 a tubular member is shown dotted at 15 embraced by the C-shaped body 10 and the tabs then lie in juxtaposition with holes 13 and 14 in register. Under such pressure as will be applied by a screw or like attachment passing through bores 13 and 14 into attachment with a support, the meshes of sheath 16 will tend to embed into the plastic strip 17 and a gripping action will be exerted upon the tubular object such as 15, this action being resilient to some degree, non-slipping, secure and positive. In like manner, it will be noted that a metal-to-metal contact of good electrical continuity will be established between the mesh sheath 16, the body 10, the tabs 11 and 12 and the metal of the tubular member 15, so that a good ground connection can be made.

The clamp of Figs. 1 to 3 has been shown as formed by using a shaped or preformed body 10 with tabs 11 and 12. Over this the sheath 16 is placed, on the inner face of the clamp the strip 17 is slipped and the unit is crimped into assembly.

It is a further modification of the invention to provide an assembly of the parts before forming the clamp to shape, whereby an economical procedure is obtained. As shown in Figs. 4 and 5, a long, thin, flat rectangular length of metal bar 20, which is to be used as the clamp body, is provided and over this an oval sheath of fine gauge metallic wire mesh 22 is slipped. On one face of the metal bar 20 and under that face of the sheath 22 there is slipped a length of thin plastic strip 24. The sleeve or sheath 22 is coextensive with bar 20 but strip 24 is shorter than bar 20 as shown. Through both wire mesh sheath 22 and bar 20, bores 21 are drilled. Thereafter, the unit 23 comprising bar 20, sheath 22 and plastic strip 24 is formed by conventional practice into a clamp as illustrated at 9 in Figs. 1 and 3.

It is within the purview of the present invention to form the unit 23 as a long length comprising material for several clamps, drill the holes 21 at desired spaces, divide the length into pieces equivalent to unit 23 and proceed to form clamps therefrom. In such instance, the plastic strip 24 would be co-extensive with the bar 20 and sheath 22 but such provision is within the scope of the present invention. It is contemplated that in some installations the presence of a nylon or like liner between tabs 11 and 12 would be advantageous although the preferred form of the present invention dispenses with this.

In another form of practicing the invention, the sheath of metallic wire mesh terminates before the tabs of the clamp and the clamp is formed in a more simple manner.

This is shown in Figs. 6 and 7. A bar of rectangular wide, thin malleable metal 25 is drilled at 26. Over the metal bar 25 there is placed an oval sheath 27 of metallic wire mesh, of slightly greater diameter than the width of the bar and between one face of sheath 27 and one face of bar 25 is slipped a plastic strip 28, of thin nylon. The strip 28 and sheath 27 are co-extensive in length but both terminate short of the holes 26 drilled in the bar 25. The metal bar with sheath 27 and plastic strip 28 is now bent into a closed end U-shape shown in Fig. 7, and the formed clamp is ready for attachment by a suitable means through holes 26 which are now substantially in register.

The clamp of Fig. 7 can be readily formed on site and the holes 26 punched out when the clamp is formed, if the metal of bar 25 is soft enough.

Thus, there is provided by the present invention an improved clamp of the type defined wherein the problems of slippage and lack of positive grip met with when using plastic liners for metal clamps is overcome. Also, where the object being clamped has a metallic surface, an excellent ground continuity is formed when using the clamp of the present invention.

It is well known that the gripping action of any clamp is enhanced by providing ribs thereon. The fine wire mesh of the sheath, sleeve or stocking used in the present invention acts as a plurality of ribs or offsets to give binding action when the clamp is tightened.

The metallic wire forming the basis of the wire mesh is selected as needed for the specific job in mind. A thicker wire presents more contact surface particularly if the mesh is open. A fine wire woven stocking will present less individual gripping action but give a greater resiliency of contact.

It should be realized that under pressure, the plastic will tend to extrude or project into and through the interstices of the wire mesh. Thus also giving a plurality of plastic contact areas which enhance the gripping action.

Again, the choice of plastic and choice of mesh size can provide any desired condition of gripping, within the spirit and scope of the present invention.

What is claimed is:

1. A clamp for gripping and holding a cylindrical object in place comprising in combination a flat, elongated thin metallic bar shaped as a closed-end U member which can embrace said object, the arms thereof being bored at their extremities, a tubular oval metallic mesh sleeve of hard wire embracing said member in the area between the bores only, and a soft deformable thin plastic strip coextensive with said sleeve and firmly held thereby between the inner face of the body of the U-shaped member between said bores and part of said sleeve, said wire being harder than the plastic material of said strip to permit permanent embedding of the wire meshes of said sleeve under pressure exerted when said clamp is tightened around said object.

2. A clamp for holding a conduit in place comprising in combination a flat thin rectangular metal bar shaped as a C-member for embracing the tube, a pair of integral metal tabs projecting from the open ends of the C-member, means for tightening of the C-member about the tube, a plastic liner in contact with the interior face of the C-member only and a metallic wire open mesh stocking embracing the liner and C-member and holding them assembled in intimate contact, the plastic of the liner being soft and the wire of the mesh stocking being harder to embed the wire in the plastic, when the clamp is tightened around the tube.

3. A friction-gripping electrically grounding clamp for tightly binding an electrical cylindrical metallic conductor at a designated locality comprising in combination a thin flat metal flexible C-shaped band for embracing the conductor, integral attaching tabs at the open end of the C-shaped band, a soft deformable insulating plastic liner in intimate contact with the inner face of said band, a metallic open mesh sleeve of hard wire surrounding said band assembling said liner therewith and extending around said tabs, and means for exerting pressure of said band upon said conductor by forcing said attaching tabs together to a degree to cause intimate electrical grounding contact of said wire mesh and said band and tabs and at least partial embedding into inner face of said soft liner of the hard wire mesh in contact therewith, to give a friction grip of part plastic and part metal wire.

References Cited in the file of this patent

UNITED STATES PATENTS

| | | |
|---|---|---|
| 2,396,838 | Ellenwood | Mar. 19, 1946 |
| 2,427,883 | Score | Sept. 23, 1947 |
| 2,557,130 | McGee et al. | June 19, 1951 |
| 2,656,021 | Butler | Oct. 20, 1953 |

FOREIGN PATENTS

| | | |
|---|---|---|
| 761,109 | Germany | May 3, 1954 |